United States Patent [19]
Feichtmayr et al.

[11] 4,035,311
[45] July 12, 1977

[54] ELECTRICAL INSULATING COMPOSITIONS BASED ON OLEFIN POLYMERS

[75] Inventors: Franz Feichtmayr; Johannes Schlag; Peter Bauer, all of Ludwigshafen, Germany

[73] Assignee: BASF Aktiengesellschaft, Ludwigshafen, Germany

[21] Appl. No.: 716,641

[22] Filed: Aug. 23, 1976

[30] Foreign Application Priority Data

Sept. 13, 1975 Germany .......................... 2540870

[51] Int. Cl.² .................. H01B 3/30; C07C 119/00; C08K 5/29
[52] U.S. Cl. .............................. 252/63.2; 252/63.7; 260/45.9 R; 260/566 F

[58] Field of Search .......................... 252/63.2, 63.7; 174/110 R, 110 SR, 110 PM; 260/45.9 R, 566 F

[56] References Cited
U.S. PATENT DOCUMENTS 3,674,695   7/1972   Wuerstlin et al. ................ 252/63.2

Primary Examiner—Harris A. Pitlick
Attorney, Agent, or Firm—Keil, Thompson & Shurtleff

[57] ABSTRACT

The present invention relates to electrical insulating compositions based on olefin polymers and a specific azomethine containing a naphthalene nucleus and serving to increase the long-term dielectric strength. The insulating compositions of the invention are particularly suitable for cables, especially high-tension cables.

1 Claim, 1 Drawing Figure

US Patent   July 12, 1977   4,035,311
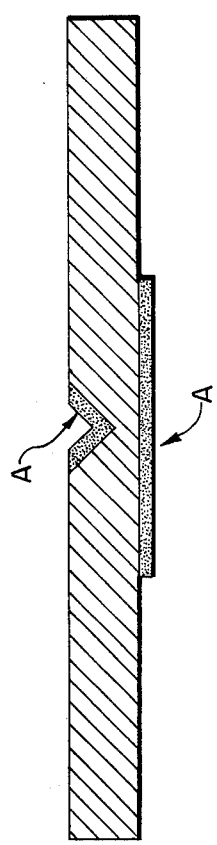

ELECTRICAL INSULATING COMPOSITIONS BASED ON OLEFIN POLYMERS

The present invention relates to electrical insulating compositions based on olefin polymers and containing additives to increase the long-term dielectric strength.

It is known to add organic compounds to conventional electrical insulating compositions based on olefin polymers to increase the long-term dielectric strength. These dielectric strength improvers are organic compounds which contain groups having a strong conjugating effect, particularly compounds containing one or more nitro groups and additional reactive groups.

However, the use of such compounds involved a number of drawbacks which could only be overcome by the use of specific azomethines as dielectric strength improvers, as proposed in German Laid-Open Application DOS No. 19 23 708.

The said German Laid-Open Application DOS Nos. 19 23 708 discloses the addition of azomethine to electrical insulating compositions based on olefin polymers to increase the long-term dielectric strength.

It has been found, however, that although compounds of the above kind considerably improve the dielectric strength when added to polyolefin insulating compositions they tend to become degraded when the electrical insulating compositions are processed, particularly when injection molded at temperatures between 106° and 210° C to form cable insulations. Since the said insulating compositions containing dielectric strength improvers are usually processed industrially at temperatures of 206° to 210° C, during which process a portion of the molten insulating composition is held at said high temperatures over a relatively long period for technical reasons, the insulating compositions contain degradation products having a detrimental effect which is not compensated for by the dielectric strength improvers added.

A further drawback of the aforementioned dielectric strength improvers is that they readily evaporate from the insulating composition during processing, i.e. at temperatures of 106° to 210° C.

It is an object of the present invention to provide electrical insulating compositions of the kind defined above which no longer suffer from the aforementioned drawbacks.

We have found that this object is achieved by using specific azomethines containing a naphthalene core as agents for increasing the long-term dielectric strength.

Accordingly, the invention relates to electrical insulating compositions based on olefin polymers and containing thermally stable agents for increasing the long-term dielectric strength. The compositions of the invention are characterized in that they contain, as an agent for increasing the long-term dielectric strength, a compound having the general formula

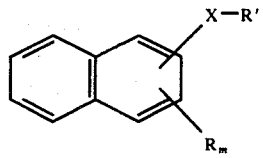

wherein
  $m$ denotes an integer of from 0 to 2,
  X denotes a group of the formula -CH=N-,
  R denotes a methyl, hydroxy-, methoxy- or ethoxy group, R' denotes a $C_{2-8}$-alkyl group, a cyclohexyl group or a group of the formula

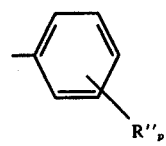

wherein
  $p$ denotes an integer of from 0 to 4, R" denotes a $C_{1-6}$-alkyl group or a $C_{1-6}$-alkoxy group, provided that when p denotes an integer of 2 to 4, the groups R" may be the same or different and the total number of carbon atoms in said groups R" does not exceed 18.

Compounds of the above general formula to be preferred for the purposes of the invention are those in the formula of which
  $m$ denotes 0 or 1,
  $p$ denotes an integer of from 0 to 2,
  R denotes methyl or methoxy, and
  R" denotes $C_{1-2}$-alkyl or methoxy.

It is a further advantage when, in the preferred compounds, the groups —X—R' and R are in the ortho- or para-position relatively to each other.

Specific examples of particularly suitable compounds have the following formulae:

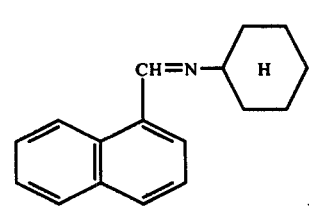

I

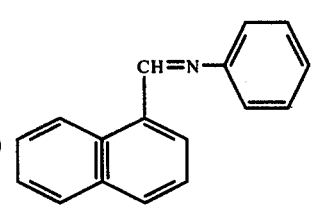

II

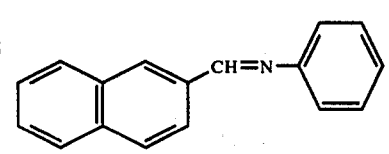

III

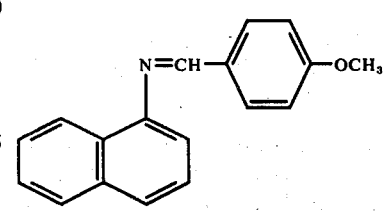

IV

-continued

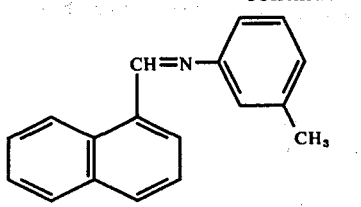
V

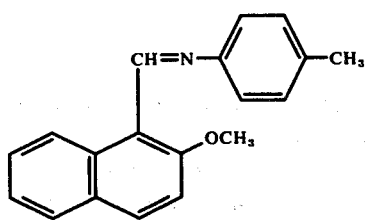
VI

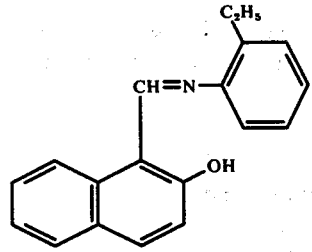
VII

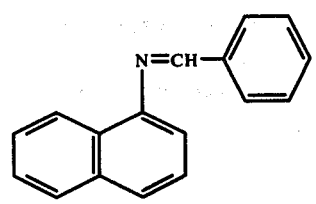
VIII

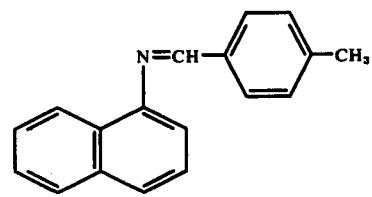
IX

Mixture of
5 parts by weight
of II
and
2 parts by weight
of XI

X

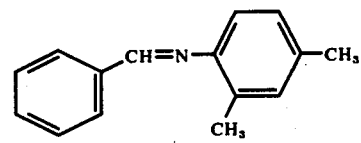
(XI)

For the purpose of the invention the azomethine may be used undividually or in the form of mixtures of two or more individuals. It has been found convenient to use the azomethine in an amount of 0.5 to 5%, and preferably from 1 to 3 percent, by weight of the total weight of the insulating composition. Advantageously, the azomethines or mixtures thereof are liquid at temperatures below 50° C.

The electrical insulating compositions of the invention are based on olefin polymers, by which we mean conventional olefin polymers. In particular, we mean homopolymers and copolymers of ethylene. More particularly, we mean polyethylenes having densities of 0.918 to 0.960, and preferably a density of about 0.920. The insulating compositions may also contain, in addition to the olefin polymers, conventional auxiliaries or additives such as crosslinking agents, e.g. peroxides; stabilizers counteracting thermal degradation; light stabilizers; carbon black and other pigments or fillers.

Manufacture of the insulating compositions from their ingredients may be carried out in conventional manner on conventional equipment, in particular by homogenizing at temperatures of from 150° to 210° C in screw-type or roller-type mixers.

The electrical insulating compositions of the invention are particularly suitable for cables, particularly high-tension cables.

In the following examples the parts and percentages are by weight.

The value "number of breakdowns" used in the following examples is determined as follows: Round test discs are compression molded from the insulating composition in conventional manner, the diameter of the discs being 69 mm and the thickness 5 mm. In the center of each disc there is a conical depression (depth of cone 4 mm, vertex angle 50° C). The said conical depression and an area of the flat surface of the other side of the disc (covering a circle of 25 mm in diameter) are metallized with conductive silver (thickness about 0.1 mm) (cf. the accompanying figure, reference A). These two metal coatings serve as electrodes in the breakdown test, the high tension being applied to the conical electrode via a needle, whereas the metallized flat surface is earthed. All breakdown tests are carried out under oil.

In each test, 10 specimens of the above kind are subjected to a voltage of 20 $kv_{eff}$ (50 c/s) for one hour and the number of specimens which show breakdown is recorded in the appropriate column of the tables given in the examples. The remaining specimens, i.e. those showing no breakdown in said first test, are then subjected to a voltage of 25 $kv_{eff}$ (50 c/s) for one hour, and here again the number of specimens showing breakdown is recorded. The specimens still showing no breakdown are then subjected to a voltage of 30 $kv_{eff}$ (50 c/s) for 1 hour, and again the number of specimens showing breakdown is recorded. In most of the examples this procedure is carried to a voltage of 35 $kv_{eff}$ (50 c/s). For example, the table given in Example 1 shows that the polyethylene stabilized according to the invention passes all 5 stages of this test without breakdown. By contrast, the corresponding control polyethylene shows 80% (8 specimens) breakdowns in the first stage (20 kv) and the remaining 20% (2 specimens) fail to pass the next stage (25 kV).

EXAMPLE 1

100 parts of a commercial granulated polyethylene having a density of 0.918 are homogenized with two parts of an azomethine having the formula designated by I in the above description in conventional manner of a roller mixer at a temperature of 160° C. The resulting composition is used for making test discs of the kind defined above.

For purposes of comparison, the above process is repeated except that no azomethine is included.

The values obtained on testing the specimens are listed in the table below.

| | Number of breakdowns at | | | |
|---|---|---|---|---|
| | 20 kV | 25 kV | 30 kV | 35 kV |
| Example | 0 | 0 | 0 | 0 |
| control | 8 | 2 | — | — |

EXAMPLES 2 TO 7

Example 1 is repeated except that the azomethines listed in the table below are used in the quantities given in the several tests. The values obtained are also listed in that table. The roman numerals given in the table indicated that the azomethine used is that having the formula designated by the corresponding roman numerals in the description above.

EXAMPLES 2 TO 9

EXAMPLES 2 TO 9

| | | Number of breakdowns | | | |
|---|---|---|---|---|---|
| Ex. | Azomethine | parts | 20 kV | 25 kV | 30 kV | kV |
| 2 | II | 2 | 0 | 0 | 0 | 0 |
| 3 | III | 2 | 0 | 0 | 0 | — |
| 4 | IV | 2 | 0 | 0 | 0 | 0 |
| 5 | V | 2 | 0 | 0 | 0 | 1 |
| 6 | VI | 2 | 0 | 0 | 0 | 2 |
| 7 | VII | 2 | 0 | 0 | 0 | — |
| 8 | VIII+IX (1 : 1) | 2 | 0 | 0 | 0 | 0 |
| 9 | X | 2 | 0 | 0 | 0 | 0 |

EXAMPLE 8

When an electric insulating composition consisting of 100 parts of polyethylene having a density of 0.918 and 2 parts of a mixture of equal quantities of the compounds of the following formulae:

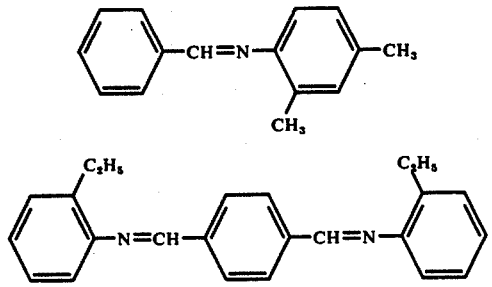

is extruded at the usual industrial processing temperatures, deposits are seen to occur on the die after extrusion for number of hours at plastics temperatures of 200° to 220° C, which deposits become detached from the die sporadically and thus provide the cable insulating with portential weak points.

When, under the same conditions, the same amounts of the compound designated by roman X in the description are used, these deposits no longer occur.

We claim:

1. Electrical insulating compositions based on olefin polymers and containing thermally stable agents for increasing the long-term dielectric strength, wherein the said agent for increasing the longterm dielectric strength is a compound of the general formula

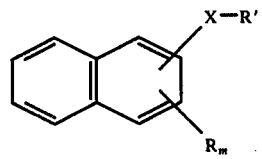

where
  $m$ denotes an integer of from 0 to 2,
  X denotes a group of the formula -CH-N-,
  R denotes methyl, hydroxyl, methoxy or ethoxy,
  R' denotes a $C_{2-8}$-alkyl group, a cyclohexyl group or a group of the formula

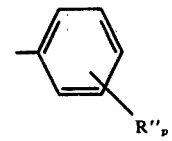

where
  $p$ denotes an integer of from 0 to 4,
  R" denotes a $C_{1-6}$-alkyl group or a $C_{1-6}$-alkoxy group, provided that when $p$ denotes an integer of from 2 to 4 the groups R" are the same or different and the total number of carbon atoms in said groups R" does not exceed 18.

* * * * *

UNITED STATES PATENT AND TRADEMARK OFFICE
CERTIFICATE OF CORRECTION

PATENT NO. : 4,035,311
DATED : July 12, 1977
INVENTOR(S) : Franz Feichtmayr et al It is certified that error appears in the above-identified patent and that said Letters Patent are hereby corrected as shown below:

Column 6, line 29, "-CH-N-," should read -- -CH=N-, --.

Signed and Sealed this

Eleventh Day of April 1978

[SEAL]

Attest:

RUTH C. MASON
Attesting Officer

LUTRELLE F. PARKER
Acting Commissioner of Patents and Trademarks